United States Patent
Erhardt et al.

(10) Patent No.: US 7,471,501 B2
(45) Date of Patent: Dec. 30, 2008

(54) CIRCUIT ARRANGEMENT COMPRISING SEVERAL CAPACITORS

(75) Inventors: Werner Erhardt, Ballendorf (DE); Hubertus Goesmann, Auernheim (DE)

(73) Assignee: EPCOS AG, Munich (DE)

( * ) Notice: Subject to any disclaimer, the term of this patent is extended or adjusted under 35 U.S.C. 154(b) by 255 days.

(21) Appl. No.: 10/569,594

(22) PCT Filed: Aug. 24, 2004

(86) PCT No.: PCT/DE2004/001878

§ 371 (c)(1),
(2), (4) Date: Oct. 10, 2006

(87) PCT Pub. No.: WO2005/022572

PCT Pub. Date: Mar. 10, 2005

(65) Prior Publication Data

US 2007/0195485 A1    Aug. 23, 2007

(30) Foreign Application Priority Data

Aug. 26, 2003  (DE)  ................. 103 39 156

(51) Int. Cl.
*H01G 4/38* (2006.01)

(52) U.S. Cl. ................. 361/328; 361/323; 361/330; 361/541; 361/522; 361/502; 361/760; 361/763; 361/766; 361/782; 361/821

(58) Field of Classification Search ................. 361/328, 361/329, 330, 763, 766, 782, 821, 760, 541, 361/522, 502, 517, 512

See application file for complete search history.

(56) References Cited

U.S. PATENT DOCUMENTS

| 4,677,523 A | | 6/1987 | Kauppi | |
|---|---|---|---|---|
| 5,515,075 A | * | 5/1996 | Nakagiri et al. | ............. 345/111 |
| 5,530,618 A | * | 6/1996 | Carroll et al. | ............... 361/329 |

(Continued)

FOREIGN PATENT DOCUMENTS

DE        35 18 236        11/1986

(Continued)

OTHER PUBLICATIONS

US 6,791,819, 09/2004, Kimura et al. (withdrawn)

*Primary Examiner*—Dean A. Reichard
*Assistant Examiner*—Hoa C Nguyen
(74) *Attorney, Agent, or Firm*—Fish & Richardson P.C.

(57) ABSTRACT

A device includes a base plate, a first cell, a second cell, and a housing in which the-first cell and the second cell are arranged. The first cell and the second cell each include at least one capacitor. The device also includes a first metal plate configured connected to a capacitor in the first cell and second metal plate connected to a capacitor in the second cell. The first and second metal plates each having at least one hole configured to receive the conductive fastening element. The device also includes an electrically conductive fastening element connected through the hole in the first metal plate and the hole in the second metal plate such that the first metal plate and the second metal plate are-electrically connected to one another and mechanically attached to one another and to the base plate.

17 Claims, 2 Drawing Sheets

U.S. PATENT DOCUMENTS

| | | | |
|---|---|---|---|
| 6,072,691 A * | 6/2000 | Suhara et al. | 361/502 |
| 6,400,555 B2 * | 6/2002 | Miettinen et al. | 361/517 |
| 6,407,907 B1 * | 6/2002 | Ahiko et al. | 361/306.3 |
| 6,922,326 B2 * | 7/2005 | Kubota et al. | 361/274.1 |
| 2002/0048139 A1 * | 4/2002 | Meadows et al. | 361/302 |
| 2003/0035262 A1 * | 2/2003 | Ikeda et al. | 361/502 |
| 2003/0133251 A1 * | 7/2003 | Kitagawa et al. | 361/328 |
| 2005/0168918 A1 * | 8/2005 | Araki et al. | 361/517 |
| 2006/0050468 A1 * | 3/2006 | Inoue et al. | 361/328 |
| 2006/0262482 A1 * | 11/2006 | Yamamoto et al. | 361/329 |
| 2007/0008676 A1 * | 1/2007 | Goesmann et al. | 361/328 |
| 2007/0053140 A1 * | 3/2007 | Soliz | 361/502 |
| 2007/0253146 A1 * | 11/2007 | Inoue et al. | 361/328 |

FOREIGN PATENT DOCUMENTS

| | | |
|---|---|---|
| DE | 89 09 246.5 | 11/1989 |
| DE | 40 08 417 | 9/1991 |
| DE | 100 21 315 | 11/2001 |
| DE | 101 13 856 | 10/2002 |
| DE | 102 18 071 | 11/2002 |
| EP | 0 450 122 | 10/1991 |
| EP | 450122 A1 * | 10/1991 |
| EP | 0 700 060 | 3/1996 |
| JP | 10-144576 | 5/1998 |
| JP | 2001-155974 | 6/2001 |
| JP | 2002-353078 | 12/2002 |

* cited by examiner

CIRCUIT ARRANGEMENT COMPRISING SEVERAL CAPACITORS

TECHNICAL FIELD

The invention relates to a circuit arrangement with a multitude of capacitors connected electrically to one another, especially double-layered capacitors.

The double-layered capacitors are sleeves that are incorporated into a thick housing insulated from the electrical connections of the capacitor and saturated with an electrolyte.

The permissible operating voltage of double-layered capacitors, however, must remain low. Because the operating voltage is significantly higher in most applications, several double-layered capacitors generally have to be connected in a row to one module.

BACKGROUND

In previously known modules of this type, metal strips or electrical lines usually connect the individual capacitors to one another electrically. The capacitor sleeves to be connected in this manner are either individually housed or insulated from one another by (in most cases) complex devices such as fastening plates, racks or drawers and mechanically attached to the outside housing and/or sealed with a sealing compound. Because the double-layered capacitors have different heights based on manufacturing tolerances and also have different expansion properties as temperatures change, mechanical tensions arise in the module constructed in this manner which damage the electrical properties of the overall module or which could even lead to the failure of the module. If one capacitor in such a module fails, the damaged capacitor cannot be replaced.

SUMMARY

Creating a compact circuit arrangement with a multitude of capacitors connected in a row can meet high mechanical requirements, can permit the replacement of individual capacitors in the event of damage, and at the same time can be inexpensively manufactured.

In some embodiments, a circuit arrangement designed as a capacitor module that has at least two cells electrically connected to one another and arranged next to one another on a base plate that in each instance contains at least one capacitor. The cells are jointly arranged in a housing. On the top side (e.g., on the side facing away from the base plate) the capacitors are connected with metal plates, each one of which has at least one hole. At the same time, two plates that are assigned to the capacitors of different cells that face one another overlap in such a manner that their holes lie congruently over one another. Supported by these plates, an electrically conductive fastening element (e.g., a fastening bolt) is conducted through the coaxial holes of the overlapping plates. These plates are set apart at equal distances from the base plate, connected to one another and mechanically attached to the base plate and to one another.

The capacitors are preferably connected to one another in a row. It is also possible to have a parallel circuit or a combination of a serial and a parallel circuit of capacitors, whereby in the latter case the capacitors of a cell, for example, are connected parallel to one another, while the cells are connected to one another in a row.

The capacitors are preferably designed as double-layered capacitors or as sleeves impregnated with an electrolyte and can have any—preferably a round or rectangular—profile. The capacitors are preferably cylindrical or flat.

A thread, for example, mechanically attaches the fastening element conducted through the holes of the overlapping metal plates to one side of the base plate. After the fastening element and the metal plates are mutually adjusted and positioned, they are firmly attached to one another, preferably by soldering or welding.

The circuit arrangement with fastening elements meets high mechanical requirements. A particular advantage of the circuit arrangement according to the invention is that the individual capacitor sleeves do not have to be sealed at the time the module is assembled. Therefore, in the event of damage the capacitors can be removed and easily replaced.

The two-part assembly of the connection elements on top between various capacitor cells guarantees essentially that connections between the capacitor cells will be free of mechanical tensions even if the capacitors have different lengths or exhibit different elongation behavior based on their manufacturing tolerances.

Sturdy and secure electrical capacitor module connections can be realized by means of fastening elements used according to the invention.

One advantageous variant of the invention provides that the fastening elements arranged on the base plate are provided at first with distancing elements that help position the different cells of the connecting metal plates. The distancing elements are preferably designed as hollow cylinders or hollow tubes of any profile.

To increase the mechanical stability and to reduce the transition resistance at the interfaces of the arrangement, the metal elements brought into contact with one another, for example capacitor connections, metal plates or bottom-side metal plates and fastening connections, are firmly attached to one another at their corresponding contact points, preferably by welding or soldering. The soldered or welded connections could in principle be replaced by pressure contacts.

It is advisable that first the capacitors of one cell, if several capacitors are provided per cell, are firmly attached to one another and mechanically and electrically connected, preferably by a metal plate or printed circuit board arranged on the bottom. In addition, the cells are fastened to the base plate and the cells are electrically connected on the top. It is also possible that the capacitors of a cell are mechanically attached on the bottom directly by means of the base plate, which is preferably provided with structures that conduct electricity.

In some embodiments, the metal plates are first positioned, on the one hand, on the fastening element and, on the other hand, positioned on the respective capacitor. The metal plates positioned in this way are then mechanically attached to the capacitor connection on top. It is also possible that the overlapping metal plates and the fastening element conducted through the latter are attached to one another, preferably by welding or soldering.

However, it is also possible that the metal plates are first mechanically attached and electrically connected to each of the capacitor connections on top, whereby one part of a select metal plate provided in each instance with another metal plate projects sideways over the top of the capacitor. The capacitors of the adjacent cells can then be positioned relative to one another so that their corresponding metal plates overlap, whereby the holes provided in the overlapping metal plates essentially overlap. The partial overlap of the metal plates can be guaranteed, for example, by staggering the heights of the overlapping parts of the metal plates.

In some embodiments, mechanically fixed attachments on the bottom of several capacitors are combined within one cell.

This connection is preferably executed as a one-piece metal plate with holes. Preferably, the metal plate is fastened by means of these holes to the capacitors of a cell by means of a second fastening element on the base plate. The second fastening element is preferably made out of a material that conducts electricity and can in this case realize an electrical connection to elements arranged on the printed circuit board.

A two- or multi-part execution of the bottom metal plate is possible, but not recommended.

Because of the different values of the individual capacitors as well as the different self-discharge behavior, the overall voltage applied is not equally distributed among the individual double-layered capacitors. Surges can occur that lead to corrosion of the double-layered capacitor. Thus in some embodiments, a discharge resistor or a discharge circuit is connected parallel to each capacitor.

In this embodiment, various groups of components that, on the one hand, are defined by capacitors and, on the other hand, are defined by switching elements (such as discharge resistors) that are arranged on the printed circuit board, are located at various sites that are arranged vertically on top of one another. This type of capacitor module is especially compact.

This embodiment also has the advantage that the elements used for the mechanical fastening (e.g., fastening bolt) at the same time realize an electrical connection to the corresponding discharge elements.

The discharge elements or groups of such elements can also in each instance be arranged on a section of a printed circuit board. The fastening bolts preferably attach each section of the printed circuit board to the base plate.

The base plate preferably consists of an electrically insulating material.

The following more precisely describes the invention by means of exemplary embodiments and related figures. The figures, by means of schematic and not-true-to-scale drawings, illustrate various exemplary embodiments of the invention. Equivalent or equivalently acting parts are indicated with the same reference code.

DETAILED DESCRIPTION

Figure 1:
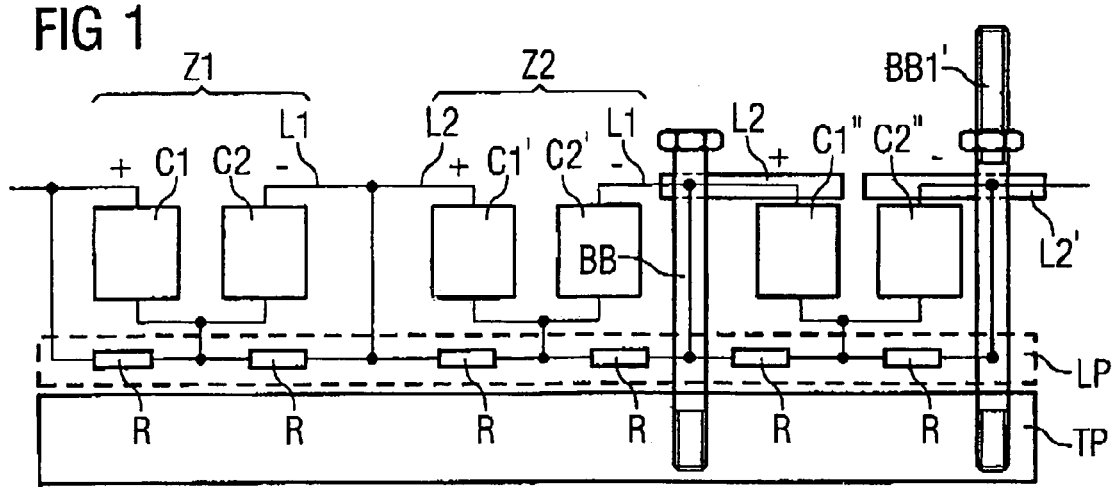
FIG. 1 illustrates a schematic side view of a circuit arrangement without a housing.

FIG. 1 illustrates a schematic side view of a module with a circuit arrangement without a housing. A printed circuit board LP is arranged on a base plate TP, which serves as a mechanical carrier of the circuit arrangement. It is indicated that resistors R are arranged on the printed circuit board LP, which resistors R in each instance are connected parallel to a corresponding capacitor C1, C2, C1', C2', C1" or C2" and which serve as discharge resistors. At the same time they prevent an unintended sudden discharge of the capacitors. The capacitors C1 and C2 are connected in a row, whereby they are mechanically attached and electrically connected to one another on side facing the base plate TP and form a cell Z1 (twin cells). The capacitors C1' and C2' are also connected in a row and form a cell Z2. The capacitors C1" and C2" are also connected in a row and form a cell.

It is indicated that the connections of capacitors C1" and C2" are mechanically attached and electrically connected to metal plates L2 and/or L2'. The metal plates are supported by electrically conductive fastening bolts BB and/or BB' and are electrically connected to other elements. At the same time the capacitor C1" is electrically connected to the adjacent cell by the plates L2 and L1 along with the capacitor C2'. The connection on the side facing away from the base plate TP of the terminal capacitor C2" is electrically connected to an external connection A2 of the module by the plate L2' and the elongated fastening bolt BB1'.

The fastening bolts preferably have at least one thread in the areas facing the base plate TP. The base plate TP provides corresponding slots or continuous openings—if necessary with threads—for receiving fastening bolts.

Figure 3:
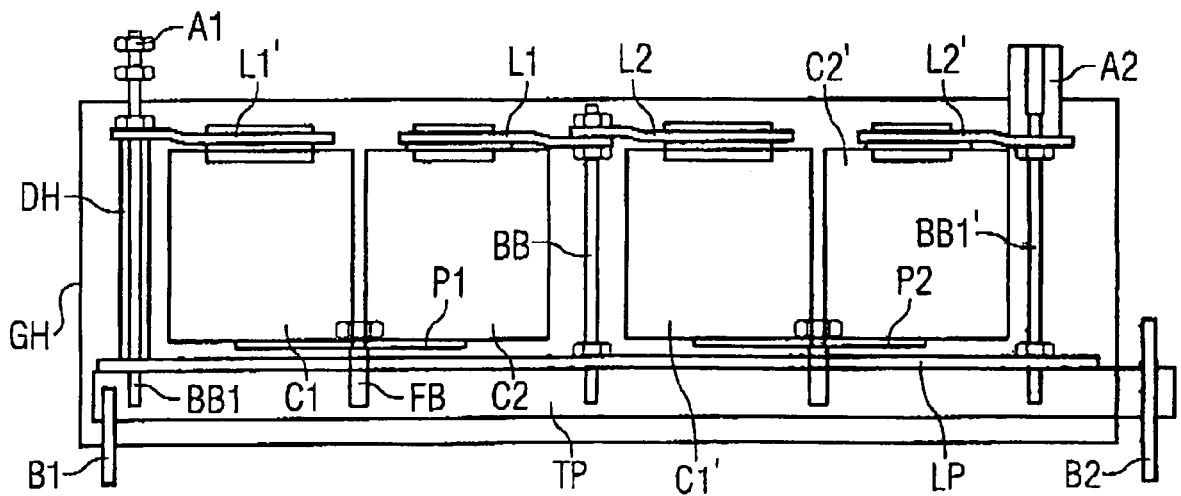
FIG. 3 illustrates a schematic side view of a circuit arrangement according to the invention with a housing.
Figure 4:
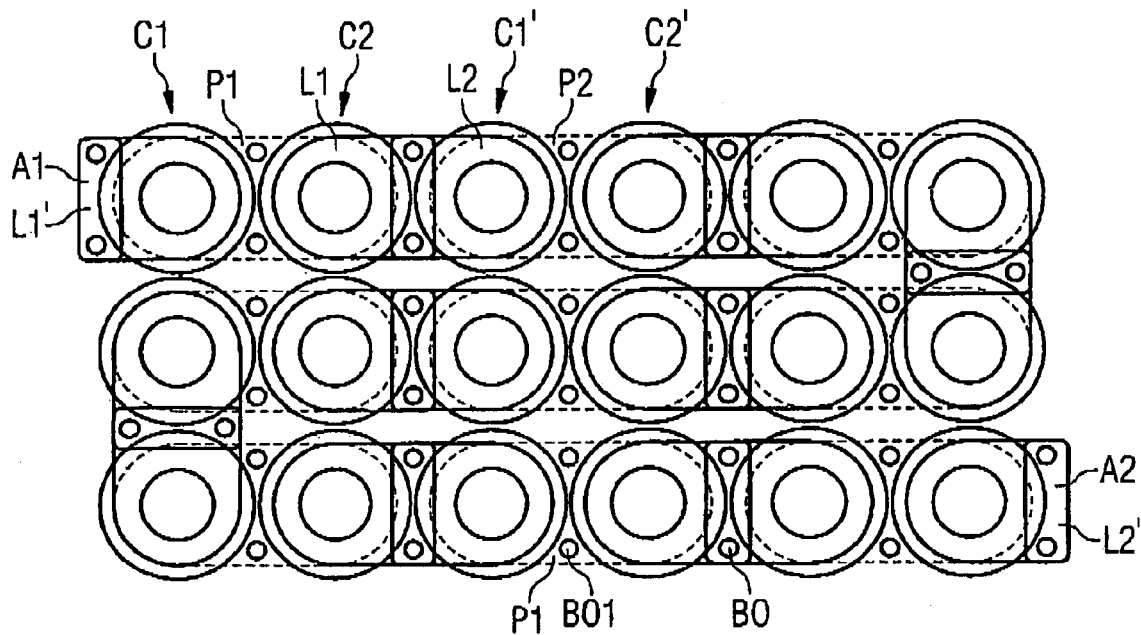
FIG. 4 illustrates a schematic top view of a circuit arrangement.

The plates L2, L2' have holes that in this instance are not shown in FIG. 4. FIG. 3 shows that the plates L1 and L2 of the capacitors that are connected to one another overlap, whereby their holes BO are arranged over one another so that the fastening bolts BB go through these holes. On the fastening bolt are devices that guarantee a reliable pressure contact and/or a good electrical connection of the overlapping plates L1 and L2. The fastening bolt BB also helps electrically connect a capacitor connection on the side facing away from the base plate TP or the printed circuit board LP to the corresponding connection of the discharge resistor R arranged on the printed circuit board LP.

In some embodiments, the discharge resistor R can be replaced by another discharge element whose impedance can be changed by a control circuit that can be realized preferably also on the printed circuit board, depending on the voltage of the respective capacitor to be protected.

Figure 2:
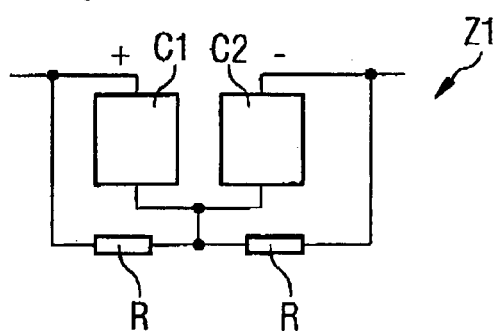
FIG. 2 schematically illustrates an equivalent circuit diagram of a cell comprising two capacitors.

FIG. 2 shows an equivalent circuit diagram of the cell Z1 according to FIG. 1. The cell Z1 comprises two capacitors connected to each other in a series or in each instance parallel to a discharge resistor R. The capacitors are fastened to the bottom of a common connection element and are electrically connected to this element, for example soldered or welded to a section of a printed circuit board or to a connecting plate.

The capacitor cells Z1, Z2 are arranged on the base plate TP and are combined on an electrical module.

In some embodiments, a cell can also have only one capacitor or more than two capacitors.

The capacitors of a cell are preferably attached mechanically and electrically connected to one another on the side facing a metal (for example, aluminum) plate P1, P2. The metal plate P1, P2 preferably has at least one hole BO1 (shown in FIG. 4) through which a fastening element FB, which is preferably a bolt, passes. The fastening element FB is fastened to a slot provided in the base plate TP for that purpose and stabilizes the construction made from the capacitors C1 and C2 that are attached to one another.

In FIG. 3 it is indicated that the plate L1' can be protected by a distancing element designed as a sleeve that surrounds the fastening bolt BB1 on all sides. Compared to the bolt BB arranged between two cells, the terminal fastening bolt BB1 is elongated and attached to an external connection A1 of the module. Distancing elements can also be provided for the bolts BB arranged between two cells.

The circuit arrangement is protected from the outside by a housing GH. The housing is preferably made from an electrically insulating material. However, it is also possible to make the housing out of metal that at the same time is preferably insulated from the connections A1, A2 and the other electrically conductive elements of the circuit arrangement.

As the left side of FIG. 3 illustrates, the base plate TP can be arranged in the housing GH or, as the right side of FIG. 3 illustrates, can extend beyond the outside wall of the housing. To fasten the module to external devices, the base plate TP preferably provides fastening devices B2, B1, or alternative slots, continuous openings or holes to receive such devices.

Like the terminal fastening elements BB1, BB1', the fastening elements BB, FB executed as bolts in some embodiments can pass through the base plate TP and thus are used for fastening the module externally. In this case, especially with a metallic housing GH, the fastening bolts are preferably not electrically conductive or at least are insulated from the module's electrical circuit.

Using the fastening elements described here, it is also possible to affix protective covers that are provided on the corresponding elements.

At least some of the fastening bolts can be provided with an interior thread or exterior thread.

FIG. 4 illustrates in a schematic top view from above the circuit arrangement with capacitors connected in a row according to the embodiment described, for example, in FIG. 3. The metal plates P1, P2 attached to the capacitors of a cell are represented with dotted lines. By means of the holes BO1, the metal plates P1, P2 along with the capacitors C1, C2 fastened on top of them are fastened to a base plate (not shown here) by means of two fastening elements executed, for example, as bolts.

Figure 5:
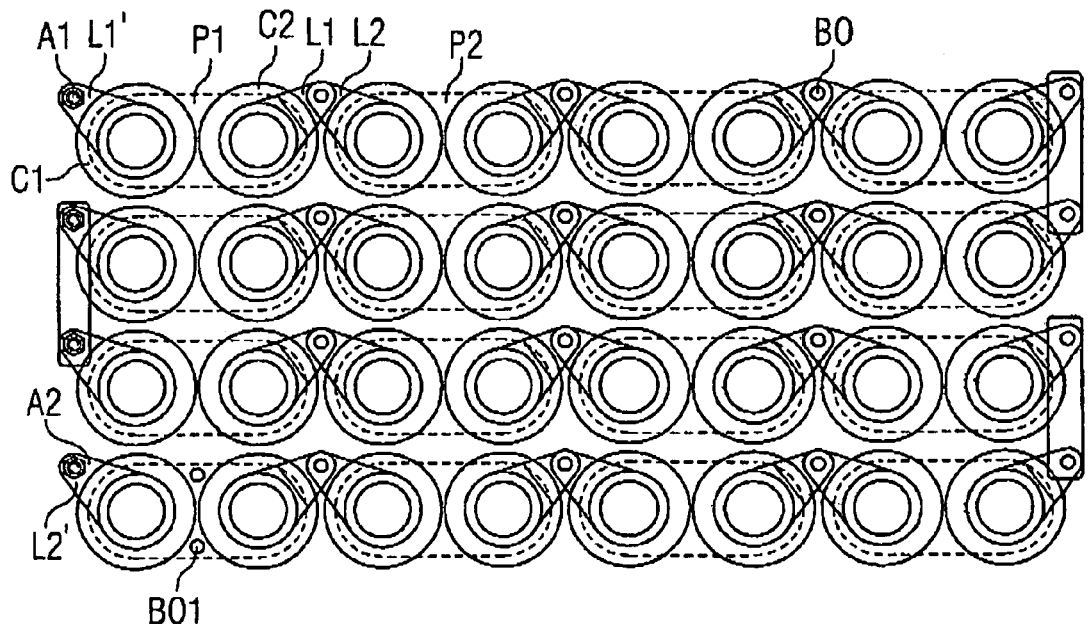
FIG. 5 illustrates a schematic top view of a circuit arrangement.

FIG. 5 shows another arrangement of the capacitor-attaching elements in the capacitor module. In this variant, the overlapping plates L1, L2 in each instance have only one hole.

Although only a limited number of possible additional forms of the invention could be described in the exemplary embodiments, the invention is not limited to these examples.

| List of reference codes | |
|---|---|
| TP | Base plate |
| LP | Printed circuit board |
| GH | Housing |
| Z1, Z2 | Capacitor cell |
| BB, FB | Fastening element |
| BB1, BB1' | Terminal fastening elements |
| DH | Distancing elements |
| C1, C2 | Capacitors of cell Z1 |
| C1', C2' | Capacitors of cell Z2 |
| C1", C2" | Capacitors of a cell |
| R | Discharge resistor |
| A1, A2 | Electrical connections of the circuit arrangement |
| L1, L2 | Metal plate |
| L1', L2' | Plate that is attached to a terminal capacitor |
| P1, P2 | Metal plate that connects the capacitors of a cell to one another |
| B1, B2 | External fastening elements |
| BO | Hole provided in the plate L1, L2 |
| BO1 | Hole provided in the metal plate P1, P2 |

The invention claimed is:

1. A device comprising:
a base plate;
a first cell on the base plate; and
a second cell electrically connected to the first cell and adjacent to the first cell on the base plate, wherein the first cell and the second cell each include at least one capacitor;
a housing in which the first cell and the second cell are arranged,
a first metal plate connected to a capacitor in the first cell on a side of the capacitor in the first cell facing away from the base plate, the first metal plate including at least one hole configured to receive a conductive fastening element,
a second metal plate connected to a capacitor in the second cell on a side of the capacitor in the second cell facing away from the base plate, the second metal plate including at least one hole configured to receive the conductive fastening element; the second metal plate and the first metal plate arranged such that the hole in the first metal plate and the hole in the second metal plate are coaxially arranged, and
an electrically conductive fastening element connected through the hole in the first metal plate and the hole in the second metal plate such that the first metal plate and the second metal plate are electrically connected to one another and mechanically attached to one another and to the base plate.

2. The device of claim 1, further comprising a printed circuit board between the base plate and the at least one capacitor.

3. The device of claim 2, further comprising a plurality of discharge resistors on the printed circuit board, each of the resistors connected parallel to a particular capacitor of the plurality of capacitors.

4. The device of claim 3, wherein the resistor is connected between a connection on a bottom side of the particular capacitor and a fastening element on a top side of the particular capacitor.

5. The device of claim 2, further comprising a plurality of discharge circuits on the printed circuit board, the discharge circuits being electrically connected in parallel to a particular capacitor of the plurality of capacitors.

6. The device of a claim 5, wherein the discharge circuit is connected between a connection on a bottom side of the particular capacitor and a fastening element on top side of the particular capacitor.

7. The device of claim 1, wherein the first cell and the second cell each include a plurality of capacitors mechanically attached and electrically connected to one another on a side of the capacitors facing the base plate.

8. The device of claim 1, wherein the housing comprises an electrically insulating material.

9. The device of claim 1, wherein the housing comprises an electrically conductive material.

10. The device of claim 1, wherein the base plate includes a slot configured to receive the fastening element.

11. The device of claim 1, further comprising a third metal plate associated with a terminal capacitor, the third metal plate being connected by an electrically conductive fastening element to an electrical connection accessible from outside of the housing.

12. The device of claim 11, wherein the third metal plate is supported by the electrically conductive fastening element.

13. The device of claim 1, wherein the base plate includes fastening devices accessible from the outside of the housing.

14. The device of claim 13, wherein the fastening devices are configured to mechanically fasten a circuit arrangement to the base plate.

15. The device of claim 1, wherein the base plate includes slots configured to receive fastening devices accessible from the outside of the housing.

16. The device of claim 15, wherein the fastening devices are configured to mechanically fasten a circuit arrangement to the base plate.

17. The device of claim 1, wherein the first metal plate and the second metal plate are at equal distances from the base plate.

* * * * *

UNITED STATES PATENT AND TRADEMARK OFFICE
CERTIFICATE OF CORRECTION

PATENT NO. : 7,471,501 B2  Page 1 of 1
APPLICATION NO. : 10/569594
DATED : December 30, 2008
INVENTOR(S) : Werner Erhardt It is certified that error appears in the above-identified patent and that said Letters Patent is hereby corrected as shown below:

In Claim 6, col. 6, line 33, after "of" delete "a".

In Claim 6, col. 6, line 35, "on" insert -- a --.

Signed and Sealed this

Tenth Day of March, 2009

JOHN DOLL
*Acting Director of the United States Patent and Trademark Office*